US009158903B2

(12) United States Patent
Metzger

(10) Patent No.: US 9,158,903 B2
(45) Date of Patent: *Oct. 13, 2015

(54) IDENTITY VERIFICATION SYSTEMS AND METHODS

(71) Applicant: TRANSUNION INTERACTIVE, INC., Chicago, IL (US)

(72) Inventor: Scott Metzger, San Luis Obispo, CA (US)

(73) Assignee: TransUnion Interactive, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,311

(22) Filed: Aug. 2, 2013

(65) Prior Publication Data
US 2013/0318588 A1 Nov. 28, 2013

Related U.S. Application Data

(63) Continuation of application No. 12/720,508, filed on Mar. 9, 2010, now Pat. No. 8,527,773.

(60) Provisional application No. 61/158,647, filed on Mar. 9, 2009.

(51) Int. Cl.
G06F 21/00 (2013.01)
G06F 21/31 (2013.01)
G06F 21/62 (2013.01)

(52) U.S. Cl.
CPC .............. G06F 21/31 (2013.01); G06F 21/313 (2013.01); G06F 21/6245 (2013.01)

(58) Field of Classification Search
CPC ....................................... G06F 21/31

USPC ......................................................... 713/176
See application file for complete search history.

(56) References Cited

U.S. PATENT DOCUMENTS

| 4,779,224 | A | | 10/1988 | Moseley et al. |
| 5,200,995 | A | * | 4/1993 | Gaukel et al. ................. 379/200 |
| 5,907,804 | A | * | 5/1999 | Schroderus et al. .......... 455/411 |
| 6,073,106 | A | * | 6/2000 | Rozen et al. ..................... 705/3 |
| 6,263,447 | B1 | | 7/2001 | French et al. |

(Continued)

Primary Examiner — Morshed Mehedi
(74) Attorney, Agent, or Firm — William J. Lenz; Neal, Gerber & Eisenberg LLP

(57) ABSTRACT

Systems and methods for authenticating the identity of a user prior to giving access to confidential data at a user interface via a network are described. In an exemplary implementation in an Internet environment, a server hosts an application providing selective access by the user to confidential data related to the user. The user provides initial data to the application as part of a request to access the confidential data. At least one database having the confidential data stored therein is accessed by the server to retrieve confidential data relating to the user located in the database based on the initial data received from the client interface. An authentication function causes the server to transmit to the client interface and present to the user an incomplete portion of the confidential data relating to the user, which is not identical to the initial data, along with at least one other portion of data having a substantially identical format to the incomplete portion of the confidential data. The authentication function requests the user to provide additional data to complete the incomplete portion of the confidential data. The user is granted access to the confidential data subsequent to determination by the application that the user correctly completed the incomplete portion of the confidential data.

25 Claims, 7 Drawing Sheets

(56) References Cited

U.S. PATENT DOCUMENTS

| | | | |
|---|---|---|---|
| 6,282,658 B2 | 8/2001 | French et al. | |
| 6,321,339 B1 | 11/2001 | French et al. | |
| 6,408,306 B1* | 6/2002 | Byrne et al. | 1/1 |
| 6,496,936 B1 | 12/2002 | French et al. | |
| 7,225,464 B2 | 5/2007 | Satyavolu et al. | |
| 7,357,310 B2 | 4/2008 | Calabrese et al. | |
| 7,392,388 B2 | 6/2008 | Keech | |
| 7,774,270 B1* | 8/2010 | MacCloskey | 705/38 |
| 7,974,612 B2* | 7/2011 | Nah | 455/418 |
| 8,151,328 B1* | 4/2012 | Lundy et al. | 726/5 |
| 2003/0163483 A1* | 8/2003 | Zingher et al. | 707/104.1 |
| 2004/0229644 A1* | 11/2004 | Heie et al. | 455/551 |
| 2005/0203799 A1* | 9/2005 | Faber et al. | 705/14 |
| 2006/0136332 A1* | 6/2006 | Ziegler | 705/39 |
| 2007/0121882 A1* | 5/2007 | Timmins et al. | 379/218.01 |
| 2007/0136256 A1 | 6/2007 | Kapur et al. | |
| 2007/0189499 A1* | 8/2007 | Martine et al. | 379/355.01 |
| 2008/0005080 A1* | 1/2008 | Xiques et al. | 707/3 |
| 2008/0010144 A1 | 1/2008 | Chatwin et al. | |
| 2008/0102819 A1* | 5/2008 | Bengtsson et al. | 455/425 |
| 2008/0103892 A1 | 5/2008 | Chatwin et al. | |
| 2008/0107253 A1* | 5/2008 | Gupta | 379/216.01 |
| 2008/0107254 A1* | 5/2008 | Yamartino | 379/221.14 |
| 2009/0010405 A1* | 1/2009 | Toebes | 379/93.23 |
| 2009/0182674 A1* | 7/2009 | Patel et al. | 705/72 |
| 2009/0262919 A1* | 10/2009 | Schoenberg | 379/221.02 |
| 2009/0319797 A1* | 12/2009 | Tornqvist | 713/176 |
| 2009/0327114 A1* | 12/2009 | Sheth et al. | 705/35 |
| 2009/0328207 A1* | 12/2009 | Patel | 726/22 |
| 2010/0125635 A1* | 5/2010 | Axelrod et al. | 709/206 |

* cited by examiner

FIG. 4

STEP 1 — STEP 2 — STEP 3 — STEP 4
●━━━━━━○━━━━━━○━━━━━━○

PLEASE VERIFY YOUR PHONE NUMBER

PLEASE CHOOSE YOUR TELEPHONE NUMBER. OUR AUTOMATED SYSTEM WILL CALL YOU AT THIS NUMBER.

- ○ (XXX) XXX - 1212
- ○ (XXX) XXX - 6849
- ○ (XXX) XXX - 9834
- ○ (XXX) XXX - 4503
- ○ (XXX) XXX - 6649
- ○ NONE OF THE ABOVE

[CONTINUE WITH TELEPHONE AUTHENTICATION]   [I WILL WAIT FOR AUTHENTICATION BY MAIL]

DID NOT MATCH

FIG. 5

STEP 1 — STEP 2 — STEP 3 — STEP 4
○━━━━━━●━━━━━━○━━━━━━○

PLEASE ENTER YOUR FULL PHONE NUMBER

PLEASE CONFIRM YOUR PHONE NUMBER BY ENTERING THE CORRECT AREA CODE AND PREFIX.

( [   ] ) [   ] -1212
AREA CODE  PREFIX

[CONTINUE WITH TELEPHONE AUTHENTICATION]

ENTERED INCORRECT AREA CODE AND PREFIX

FIG. 6

STEP 1　　　STEP 2　　　STEP 3　　　STEP 4

PLEASE ENTER YOUR FULL PHONE NUMBER

⚠ THE AREA CODE AND PREFIX ENTERED DO NOT MATCH OUR RECORDS. PLEASE CORRECT YOUR ENTRY.

PLEASE COMPLETE YOUR PHONE NUMBER BY ENTERING THE CORRECT AREA CODE AND PREFIX.

ONCE THE SYSTEM CONFIRMS YOUR TEPEPHONE NUMBER, A TELEPHONE SECURITY CODE WILL DISPLAY AND THE AUTOMATED SYSTEM WILL CALL YOU.

( [213] ) [555] -1212
AREA CODE  PREFIX

[ CONTINUE WITH TELEPHONE AUTHENTICATION ]

ENTERED INCORRECT AREA CODE A SECOND TIME

IDENTITY VERIFICATION SYSTEMS AND METHODS

CROSS-REFERENCE TO RELATED APPLICATION

This application is a continuation application of U.S. patent application Ser. No. 12/720,508 which was filed on Mar. 9, 2010 entitled "IDENTITY VERIFICATION SYSTEMS AND METHODS" and claims priority to Provisional Patent Application Ser. No. 61/158,647, filed on Mar. 9, 2009 entitled "IDENTITY VERIFICATION SYSTEMS AND METHODS" both of which are incorporated herein by reference in their entirety.

TECHNICAL FIELD

The following disclosure relates to identity verification, and more particularly, to systems and methods for authenticating the identity of an individual prior to allowing access to confidential or secure information pertaining to that individual, such as a credit file or report, particularly over computer connections across a network, such as the Internet.

BACKGROUND OF THE INVENTION

The consumer lending industry bases its decisions to grant credit or make loans, or to give consumers preferred credit or loan terms, on the general principle of risk, i.e., risk of foreclosure. Credit and lending institutions typically avoid granting credit or loans to high risk consumers, or may grant credit or lending to such consumers at higher interest rates or other terms less favorable than those typically granted to consumers with low risk. As a means to quantify risk and allow for relative comparison between individual consumers, lenders use a credit score. A credit score is a numerical approximation of risk associated with an individual consumer and is generated based on that consumer's credit history. Credit bureaus have evolved to generate various types of credit scores based on respective proprietary processing of underlying credit information and other data related to an individual. These credit scores are marketed under various trade names, such as True Credit® by TransUnion, VantageScore$^{SM}$ by VantageScore Solutions LLC, FICO® by Fair Isaac Corporation, etc., and are all intended to provide the best possible risk indicator for a particular individual. Among other things, the credit bureaus assess the credit history of individual consumers, process and maintain credit scores, and present credit score to lenders upon request.

As the credit score represents a consumer's ability to obtain and maintain credit, it is important for consumers to monitor their score. While the credit score is typically a product of the consumer's activities, it is possible that the activities of others, whether through fraud or through unknown but authorized use, may affect the credit score as well. In such cases, a consumer may be able to correct harm, or at least prevent further harm, to their credit file if such activities are identified through the monitoring process and addressed in a timely manner. If unintended activities are not identified by a consumer and rectified in a timely manner, severe damage to that consumer's credit score can occur, which may significantly impair that consumer's ability to obtain credit or a loan.

Due to the increasing importance of monitoring credit files, systems have been developed to help consumers with the process. Such systems, for instance, may alert the consumer when certain activity has occurred that will negatively affect their credit score. However, for security reasons, no specific information would generally be relayed. Rather, the consumer, upon receiving an alert, must check his or her credit file manually to determine the validity of the new credit transactions. Other reasons a consumer might need quick access to their credit file may include: to determine how much credit is likely to be available to them; to ascertain their credit score; or to simply check what active accounts are attached to their credit.

The increasing availability of networks such as the Internet, and especially the improved ability to present data in a secure manner through a webpage on the Internet—such as, for example, through application of secure sockets layer (SSL) protocol or Virtual Private Networks (VPNs)—have enabled the development of systems and related services for viewing secure information remotely via a client device or interface, such as a personal computer, laptop or mobile device having internet or network functionality. The Internet in particular provides a powerful and widely accepted medium for such systems due to its ubiquitous nature. A consumer wishing to view his or her credit history may now do so over any device having direct connectivity or indirect access to the Internet, provided that the consumer can be properly authenticated and his or her credit file can be found. In addition, many other sources of private, secure information can be made available through use of the Internet. For example, banks or other financial service entities might make account history available to account holders, insurance companies might make claims or other account information available to their clients, hospitals or other medical care providers might make patient medical records available to their patients, academic institutions might make tuition statements or grades available to their students, the government might make tax history available to tax payers, etc. In essence, any organization that generates or collects private information on individuals might benefit by using the Internet to display or deliver that information directly to those individuals, rather than relying on more costly and time consuming methods of conveying such information.

A first step prior to disclosing any such information, however, is to ensure the individual's identity is properly authenticated. If an organization is careless in granting access or displaying information, at a minimum, the secure nature of the data it stores will be compromised, with the potential of having disastrous consequences and liability resulting therefrom. The utility of the Internet in these security sensitive applications cannot be harnessed if this first step is not properly managed.

The traditional means to perform Internet ("on-line" or "web-based") verification is by having the website visitor initially set up an account and provide a set of information that, in theory, only the website visitor would know. Many systems rely on nothing more than a username or account number to identify the account and a password to authenticate the website visitor. While this may be effective, passwords provide little security if they are ascertainable by others. In order to make it harder for others to ascertain passwords, password requirements have become more complex. However, this causes people to often forget them. When a password is forgotten, a back-up method of authentication is required. In other cases, such as with consumer credit files, information may be maintained in the absence of a specific account and password. For instance, a credit bureau collects a consumer's credit history regardless of whether he or she has ever contacted the credit bureau to establish a personal account and password. Thus, credit bureaus cannot rely on a consumer having a password, but must authenticate the consumer through other means should they seek access to their credit file.

The method generally used when a password is forgotten, or when such a means of authentication is not suitable, is to ask a website visitor one or more personal questions through the website interface. The answers to these questions are stored within the website visitor's file and have either been previously supplied by the website visitor or consist of certain private data that only the website visitor would likely know. When such questions are presented and answered correctly, system designers can have a higher level of confidence that the website visitor has been properly authenticated.

While this question and answer process is a generally effective primary means of authentication, and an effective secondary means in the case of password failure, it has its limitations. In some cases, there is simply not enough information within the individual website visitor's file to generate proper authentication questions. In other cases, the website visitor may be presented with questions which they need to look up to properly answer, which may not be readily available. Finally, there is the inevitable scenario where, for any number of reasons, an answer supplied does not match the recorded answer within the account.

The principles of the invention address these and other problems through the application of additional systems and methods for, among other things, identity verification of a user seeking access to confidential information over a network, such as the Internet. These systems and methods can be used as either primary or back-up means to authenticate users of a network, such as website visitors on the Internet, prior to granting access to confidential information, such as, for example, credit file data. These and other aspects of the invention will become readily apparent from the written specification, drawings, and claims provided herein.

SUMMARY OF THE INVENTION

Systems and methods are provided for verifying the identity of a network user (sometimes referred to herein as "user," or in the case of the Internet, "website visitor") prior to granting the user access to confidential information, such as a secure account or file data associated with the user over the network. These systems and methods have particular, but not exclusive, applicability to website applications associated with the Internet. The systems and methods are designed to, among other things: (1) provide a secondary means for authentication for use in cases where a primary means of having the user answer certain questions fails to authenticate them; (2) provide an alternative primary means of authentication that is both secure, quick and effective, and may be preferable to users in certain situations; (3) utilize a user's device associated with a secondary network, such as a phone line associated with the PSTN or a mobile data device associated with a data network, to provide an additional means of on-line authentication; and (4) provide an authentication tool that can be used simultaneously by various entities that can access various disparate file databases, and can be operated by a third party separate from such entities and/or databases to provide authentication services.

In a particular exemplary embodiment, a system for accessing confidential data of a user via a network comprises a server hosting an application providing selective access by the user to confidential data related to the user; a client interface capable of interfacing with the server via the application, wherein the user provides initial data to the application as part of a request to access the confidential data; and at least one database having the confidential data stored therein, the database being in communication with the server to allow the server to retrieve confidential data relating to the user located in the database based on the initial data received from the client interface. The application includes an authentication function that causes the server to transmit to the client interface and present to the user an incomplete portion of the confidential data relating to the user, which is not identical to the initial data, along with at least one other portion of data having a substantially identical format to the incomplete portion of the confidential data. The authentication function requests the user to provide additional data to complete the incomplete portion of the confidential data. The user is granted access to the confidential data subsequent to determination by the application that the user correctly completed the incomplete portion of the confidential data.

Illustrative of a particular exemplary embodiment adapted for use in connection with a web application on the Internet, a website visitor accesses a website/web application hosted by a server via a client interface to view his or her confidential data, such as private account data. The website visitor provides the web application with initial basic recognition data, such as, for example, their name or account number. The application utilizes the initial data in a search of one or more appropriate databases to locate and obtain the confidential data. In the authentication process, the website visitor is presented with an incomplete portion of the confidential data (not utilizing the initial data), along with one or more other data portions in a substantially identical format. For example, a portion of the confidential data may comprise a phone number associated with the website visitor. In such an example, an incomplete portion of that phone number is displayed on the website interface along with several other incomplete phone numbers, which may be randomly generated. The website visitor is prompted to select the incomplete phone number corresponding with his or her phone number. If the correct selection is made, the website visitor is then prompted to provide the remaining digits of the incomplete phone number. If the phone number is correctly completed, the web application generates a call through a telephonic device, such as, for example, a telephonic PC card or interactive voice response system, to a device associated with the phone number for final authentication. The authentication may include display of a randomly generated PIN on the client interface and request by the voice response system for entry of the PIN via the device associated with the phone number. In an embodiment utilizing a voice response system, the voice response system queries the website visitor for the PIN through the device associated with the phone number. If the website visitor supplies the PIN within a predetermined time period, the voice response system communicates a successful authentication message to the server and the website visitor may proceed to view the secure files.

In other embodiments described herein, the PIN may be provided to the device associated with the phone number for entry by the website visitor into the client interface in communication with the web application. In yet other embodiments, the PIN may be sent to, or received by, any device other than the device utilized in communicating with the application. In yet other embodiments, the PIN may be sent to, or received by, any device associated with the website visitor over any network other than the network utilized in communicating with the application, such as a wireless data network or voice network.

These and other embodiments, and various permutations and aspects, will become apparent and be more fully understood from the following detailed description and accompanying drawings, which set forth illustrative embodiments that are indicative of the various ways in which the principals of the invention may be employed.

BRIEF DESCRIPTION OF THE DRAWINGS

FIG. 4 is a website interface presenting phone numbers for selection by a website visitor according to a particular embodiment.

FIG. 5 is a website interface requesting additional phone number information according to a particular embodiment.

FIG. 6 is a website interface requesting additional phone number information according to a particular embodiment.

DETAILED DESCRIPTION OF EXEMPLARY EMBODIMENTS OF THE INVENTION

Figure 1:
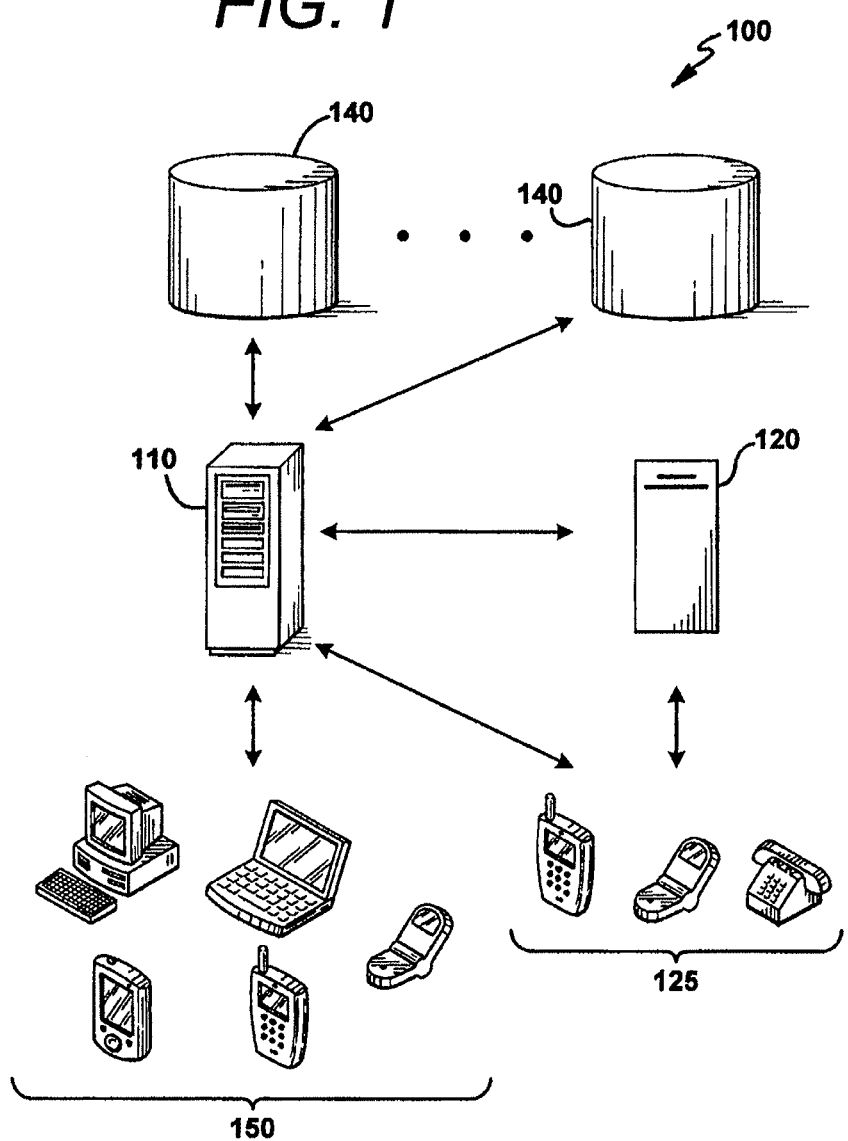
FIG. 1 is a schematic diagram illustrating an exemplary embodiment of a system in accordance with one or more the principles of the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with one or more principles of the invention. For simplicity of presentation, all components that may be employed in one or more of the embodiments described herein are collectively illustrated schematically in FIG. 1, with the understanding that one or more of these components may or may not be included in any particular embodiment depending on functionality and the particular principles being applied. Accordingly, the embodiments described herein should not be limited thereby. With this understanding, a system 100 includes a server 110, which may host an application, such as a web-based server application in applications involving the Internet, which includes an identity verification/authentication function. The server 110 is preferably an interactive server. The system 100 also includes one or more databases 140, which may be co-located with the server 110, or located remotely therefrom. The system 100 also includes a telephony device, such as an automated calling system in the form of an interactive voice response system 120 (IVR), a primary device, such as a client (user) device/interface 150, which may include a web browser or other internet interface functionality in Internet-based applications, and a secondary device, such as, for example, a telephone, or other data or voice communication device 125. These components may be embodied in numerous forms and may differ in various embodiments, and, in some embodiments, two or more components may be combined into a unitary device. Additionally, a particular component may serve more than one function which may have been carried out by other components.

While depicted schematically as a single server, computer or system, it should be understood that the term "server" as used herein and as depicted schematically in FIG. 1 may represent more than one server or computer within a single system or across a plurality of systems, or other types of processor based computers or systems. The server 110 includes at least one processor, which is a hardware device for executing software/code, particularly software stored in a memory or stored in or carried by any other computer readable medium. The processor can be any custom made or commercially available processor, a central processing unit (CPU), an auxiliary processor among several processors associated with the server 110, a semiconductor based microprocessor (in the form of a microchip or chip set), another type of microprocessor, or generally any device for executing software code/instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by the processor.

The software in memory or any other computer readable medium may include one or more separate programs. The separate programs comprise ordered listings of executable instructions or code, which may include one or more code segments, for implementing logical functions. In the exemplary embodiments herein, a server application or other application runs on a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system essentially controls the execution of computer programs, such as any application of server 110, and provides scheduling, input-output control, file and data management, memory management, and communication control and related services.

An exemplary and non-limiting embodiment will now be described having application in an Internet environment. In a particular embodiment, the server 110 is a host computer that hosts a website, web application, or server application (hereinafter generally referred to as "server application" or "web application") wherein users/visitors to the website or clients to the server may access their secure/confidential information. Information may include, but not be limited to, a credit record, a tax record, a medical record, a financial record and an insurance record. In different embodiments, the server 110 and the website it hosts are affiliated with different business entities. For instance, in one embodiment the server 110 is managed by a credit bureau. In other embodiments, it is managed by a bank, an insurance company, a hospital, and various other entities that hold secure information corresponding to website visitors who may wish to access that information. In still other embodiments, the server 110 is operated independently, such as by an application service provider ("ASP"), and provides for third party authentication for various client entities.

One or more databases 140 house confidential information referred to above. In some embodiments, one or more databases 140 and the server 110 are housed within the same computer system or on a common network. In other embodiments, one or more databases 140 exists separately, and communication between the two components is provided over the Internet, through a dedicated secure data link, through a secure network or other network, such as for example, a WAN or LAN, or other known means of communicating or transmitting electronic data. Other embodiments may comprise several databases 140, wherein one or more of the databases belong to separate entities, and wherein each database 140 is in direct or indirect communication with the server 110.

Telephone interactive voice response system 120, referred to herein as "the IVR system," which may be employed in certain embodiments, is a computerized automated calling system that, upon request, dials a phone number, plays a pre-recorded message and records responses to that message. The IVR system 120 may comprise a stand alone computer, system, processor, software, or a PC-type telephony card and associated software that is capable of communication with the public switched telephone network ("PSTN"). In some embodiments, the IVR system is in communication with the server 110 through the Internet, a dedicated data link or other network, such as, for example, a WAN or LAN, or other known means of communicating or transmitting electronic data. In other embodiments, the IVR system 120 is co-located with the server 110 and is driven by the same computer or is part of the same system. The IVR system 120 connects with a website visitor's telephone or voice device 125 through the PSTN via any PSTN-computer interface scheme incorporating hardware, firmware, or software known in the art, and may include a telephony interface PCI or PCMCIA card, IP telephony module, VoIP or PSTN gateway, etc. The PSTN interface is preferably part of the IVR system. The website visitor's telephone or voice device 125, sometimes referred to herein as "the phone," may be a cell phone, a land line, or any communication device capable of transmitting and receiving audio and/or keyed-in data such as through an alphanumeric keypad.

The website visitor's device or Internet capable interface 150, sometimes referred to herein as "the website interface" or "client device" or "client interface," may take a variety of forms in different embodiments and allows the website visitor to interact with the website or server application hosted by the server 110. In some embodiments, the website interface 150 is a standard personal computer or laptop, though any computer or electronic device having network or Internet connectivity may be used. In other embodiments, the website interface 150 is a handheld device, such as a cellular telephone, PDA-style device, or other mobile data device with network or Internet capability, such as, for example, a Blackberry® device manufactured by Research In Motion Limited, or an iPhone® device manufactured by Apple, Inc.

According to a particular embodiment, an individual connects his or her interface 150 to the server 110 through the Internet via a web browser application or other interface application and, through the server application hosted by the server 110, makes one or more selections indicating a desire to view secure or confidential data. Preferably, the server 110 utilizes SSL or other secure communications protocol for secure or encrypted communication between the website interface 150 and the server 110. In other embodiments, a VPN may be employed. When the server is accessed via the interface 150, the application of the server 110 first prompts the website visitor for some basic information (initial data) so as to identify the applicable confidential data set. This information may be in the form of an account number, a full or partial social security number or the website visitor's name and date of birth, for instance. The web application uses this information to search database 140 for the appropriate file. Once the appropriate file is located, the server application presents an incomplete portion of the confidential data, such as an incomplete portion of the website visitor's phone number from that file, along with incomplete randomly generated phone numbers having a substantially identical format, to the website visitor via the interface 150. If the website visitor selects the proper incomplete phone number and provides the correct missing data, the web application of the server 110 directs the IVR system 120 to place a call to the website visitor's secondary device 125. The web application of the server 110 also generates a PIN number and causes it to be displayed on the website interface 150. Once in communication with the phone 125, the IVR system 120 prompts the website visitor for the PIN. The IVR system 120 records the website visitor's response and conveys it back to the web application of the server 110. If the PIN is correct, the web application of the server 110 has successfully authenticated the website visitor and proceeds to allow access to the secure file.

Figure 2A:
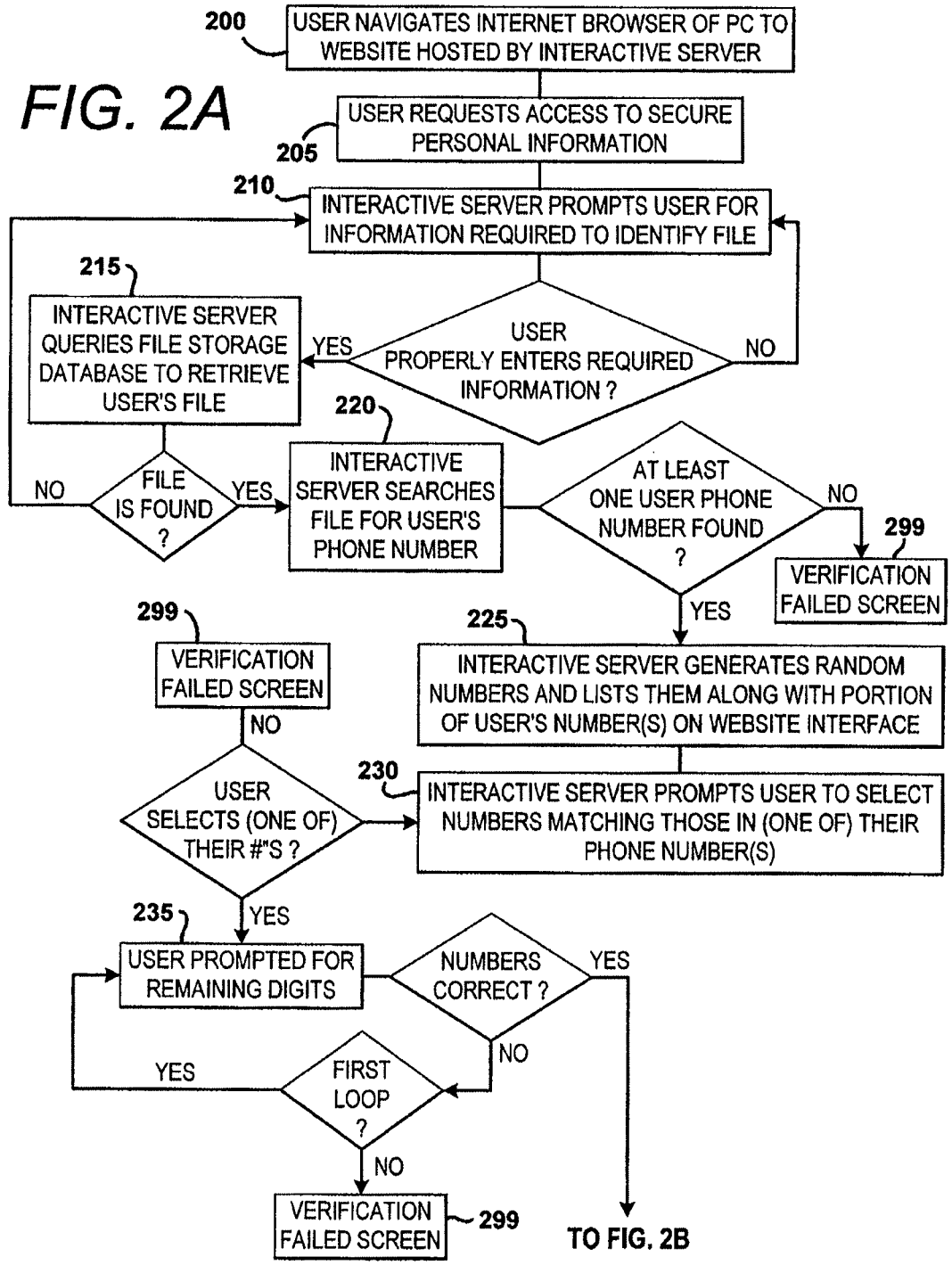
FIG. 2A is a flow chart that graphically depicts the steps of an embodiment of an identify verification process in accordance with one or more the principles of the invention.
Figure 2B:
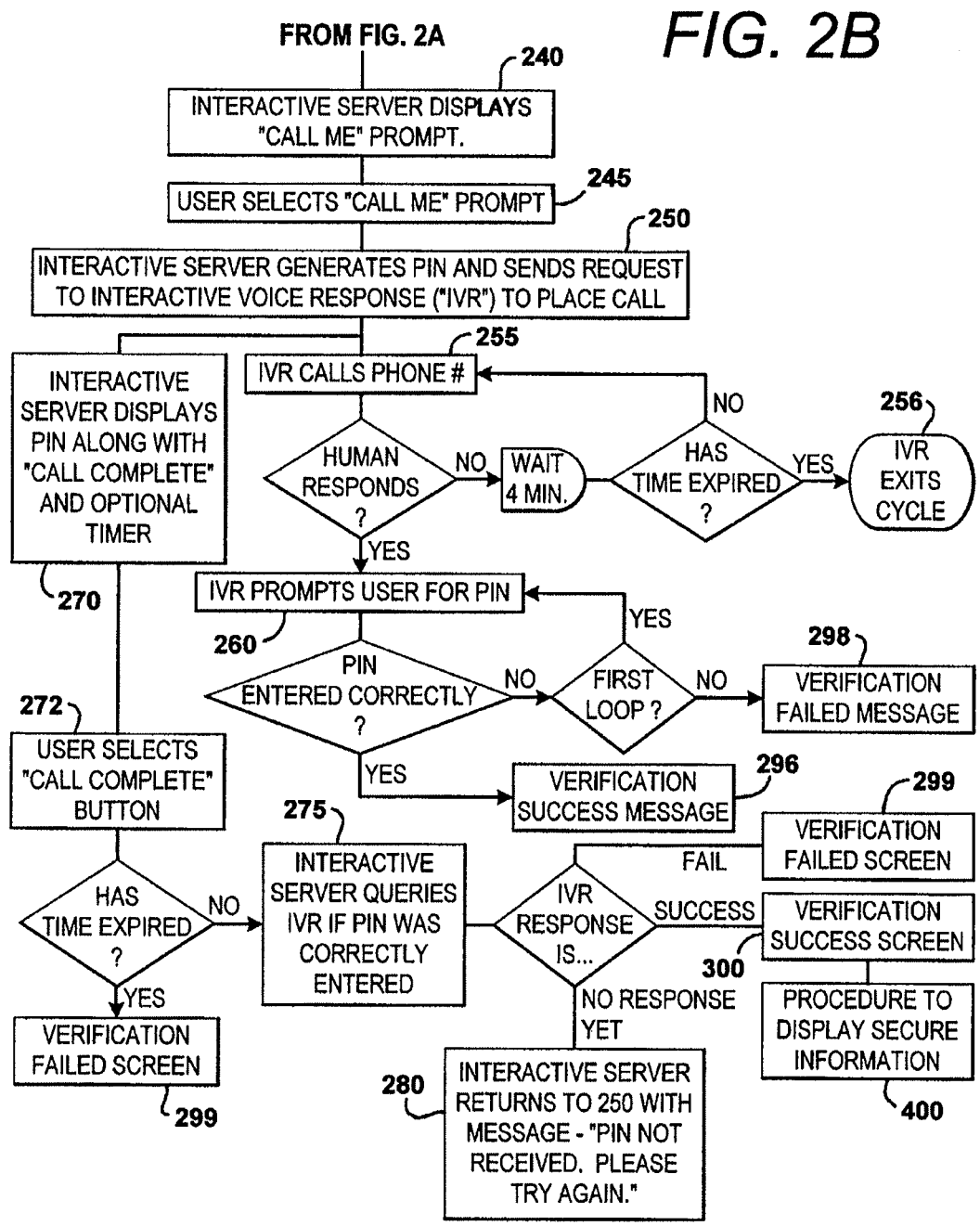
FIG. 2B is a continuation of the flow chart described in FIG. 2A above.

The above description provides a general overview of operation of a system according to one or more embodiments. With reference to the flow chart provided in FIGS. 2A and 2B, a more detailed description is given of the steps involved in the foregoing description, along with an understanding of the variations in those steps present in other embodiments. As can be seen with step 200, the process is initiated when a website visitor navigates the website interface 150 to the website or application hosted by the server 110. In some embodiments, the website contains many different HTML pages linked to a homepage. In such cases, the website visitor may be required to navigate through those webpages until reaching the webpage used to request access to secure data. Once arriving at such a webpage, the website visitor in step 205 submits a request for secure data corresponding to their person. An authentication function associated with the web application of the server 110 responds to this request by seeking certain initial data from the website visitor for identification purposes at step 210. In other embodiments, steps 205 and 210 are combined such that the request for secure or confidential data is accomplished directly by supplying the data needed for identification.

The data fields for identification at step 210 vary across the many embodiments, but may include such data fields as name, address, date of birth or full or partial social security number. This type of information is sometimes referred to as "wallet" information, implying that it is of the type of information that is typically found on driver's licenses, Social Security cards, or other identification cards carried in a wallet. In other embodiments, step 210 simply requests an account number. In certain embodiments utilizing the IVR system, step 210 preferably does not solicit entry of a telephone number as that data field may be used later in the process. Whatever fields are chosen for file identification in a particular embodiment at step 210, the website visitor is preferably required to fill in the fields. In certain embodiments, failure to do so may prevent the process from moving forward and present the website visitor with a repeat request for the data.

Once the web application of the server 110 receives data from the data fields, at step 215 it searches the database 140 for a data file matching the data submitted by the website visitor. If a particular data file is found, the process proceeds to step 220. However, if no such file is located based on the submitted data, the process preferably loops back to request corrected data, and the web application of the server 110 generates an error message on the website interface 150 noting that no file was found corresponding to the submitted information. In the alternative case where multiple files correspond to the submitted information, in some embodiments, the web application of the server 110 may respond to the website visitor through the website interface 150 with this result and seek submission of more specific data for identification purposes so as to isolate the correct data file.

As noted above, the server 110 and the database 140 are housed in a single computer in some embodiments, and are physically separate components in other embodiments. In still other embodiments, where there are multiple databases 140 that may be managed by one or more separate entities, a step is incorporated into the process prior to or as part of step 205 whereby the website visitor identifies from which entity he or she is seeking the secure data. Based on this response, in some embodiments, the web application of the server 110 alters the set of required data fields for file identification. For example, a bank and a credit bureau might both contract with a third party authentication service or ASP that utilizes the systems and methods described herein. In such an embodiment, the bank and the credit bureau are unrelated entities, and both are unrelated to the authentication service organization. Each has one or more separate databases 140 which are linked to the authentication service on server 110. In such a scenario, a website visitor first identifies whether he or she wants to view their credit records or their bank records. Based on this input, the web application on server 110 will generate a request for the data fields needed to isolate a specific file within the appropriate database 140. In such fashion, there may be many disparate databases incorporated into the process.

When a particular file has been located based on the data supplied by the website visitor, the web application of the server 110 searches the file for a phone number associated with the website visitor at step 220. In certain embodiments, if no phone number is found in the file, the authentication process fails and the web application of the server 110 conveys an authentication failure message through the website interface 150 at step 299. In other embodiments, other confidential data may be utilized for incomplete presentment to the website visitor for purposes of the verification process. However, where at least one phone number exists within the file, the process continues to step 225.

At step 225, the web application of server 110 generates several random numbers and displays them along with one or more incomplete website visitor phone numbers based on phone numbers located within the website visitor's file in substantially identical form (e.g., NPA-NXX form, which does not include the remaining four digits of the phone number). Though some embodiments display one or more pre-designated or non-randomly generated numbers alongside the incomplete phone number, this provides for less security. In either case, the server 110 displays at least one number that is different from any of the incomplete phone numbers associated with the website visitor that are displayed. Though the numbers can be displayed in any fashion or order, the illustrated embodiment shown in FIG. 4 seeks to mask the website visitor's phone number by intermingling it with the randomly generated numbers. In addition, the illustrated embodiment offers a "none of the above" selection.

Generally, phone numbers found within the file will consist of a three digit area code and a three digit prefix (i.e., NPA-NXX), and a four digit suffix. The number of randomly generated numbers displayed, the number of digits displayed, and the overall arrangement of the display of numbers may vary across embodiments. The web application on server 110 may be programmed to display any portion or combination of these ten digits. The web application on server 110 in the exemplary embodiment illustrated in FIG. 4 has displayed the four digit suffix and left the area code and the three digit prefix (NPA-NXX) blank. Such a selection of digits is useful because the last four digits of a standard ten digit phone number are more random in that they are not tied to a geographic area (the "NPA" refers to "Number Plan Area," commonly known as Area Code and the "NXX" is the next finer number indicator within an Area Code and refers to a Central Office (or end office) of the phone service provider). As can be seen in FIG. 4, the web application of server 110 generates and displays the random numbers in substantially identical fashion as it displays the one or more incomplete phone numbers associated with the website visitor.

At step 230, the website visitor is requested by the web application of server 110 through the website interface 150 to select the incomplete phone number corresponding with their own phone number. In cases where the web application of server 110 has identified and displayed incomplete versions of multiple phone numbers it found within the website visitor's secure file, the website visitor may select any of the incomplete versions of their phone numbers displayed to successfully complete this step. Though selection methods vary across embodiments, the illustrated exemplary embodiment in FIG. 4 provides radio buttons to facilitate selection. Upon selection by the website visitor, the application of server 110 will determine whether the website visitor selected the incomplete version of a phone number contained within the secure file. If so, the process proceeds to step 235. If not, in certain embodiments, the process may fail and the web application of server 110 will generate a verification failure message at step 299. The system is preferably designed not to allow a website visitor to execute a "back" function of the web access application or browser running on the interface 150 so as to reload the previous page (e.g. FIG. 4) and try again. In certain embodiments, an attempt to do so will generate an error message. Thus, preferably, step 230 requires proper selection the first time or the process will fail and the website visitor will have to use another process to authenticate his or her identity. In such embodiments, because there is no room for error at this step, a warning is preferably presented to the website visitor through the interface 150 that an incorrect selection at this step will cause the authentication process to fail.

At step 235, after the website visitor has selected an incomplete phone number corresponding to one of his or her phone numbers, the web application of server 110 prompts the website visitor to enter the missing digits of the selected phone number. This step minimizes the random chance that a fraudulent website visitor simply guessed correctly at step 230. A variety of interface methods are used across various embodiments, but the embodiment illustrated in FIG. 5 provides two blanks for the website visitor to fill in corresponding to the three digit area code and the three digit prefix (NPA-NXX). Unlike in the case of step 230, the embodiment illustrated within the flowchart at FIG. 2A grants a second chance if the missing numbers are not properly entered. Where one or more supplied digits are incorrect, the web application of server 110 generates a message such as that shown in FIG. 6 indicating a non-match and allowing re-entry. Some embodiments may grant only one chance while others may grant several chances. Ultimately, however, the proper digits must be entered to complete the entire phone number within the record. If this is not done upon the last chance, the authentication process fails and the web application of server 110 generates a verification failure message on the website interface 150 at step 299. Once again, if this step is reached, the process in some embodiments disables the "back" feature of the web browser on website interface 150 such that step 235 may not be revisited.

Figure 7:
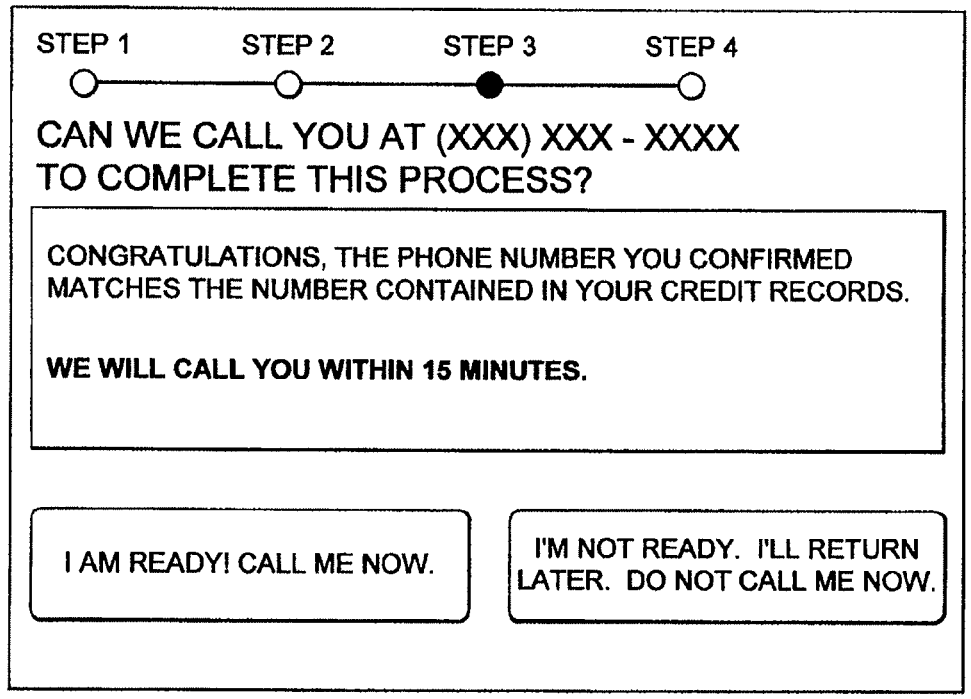
FIG. 7 is a website interface presenting a website visitor with a prompt to place a phone call according to a particular embodiment.

With a website visitor's phone number selected and the proper digits supplied by the website visitor, in some embodiments, the web application of server 110 displays the phone number to the website visitor on the website interface 150 at step 240 (shown on FIG. 2B) along with a "call me" prompt. The "call me" prompt may take various forms and may use other language across the various embodiments, but, in a particular embodiment, appears as shown in FIG. 7. The website visitor selects the "call me" prompt at step 245 to initiate a phone call through the IVR system 120. In alternative embodiments, steps 240 and/or 245 are skipped. In such embodiments, the web application running on server 110 causes the IVR system 120 to generate a call to the phone number (i.e. step 250) when the website visitor supplies the proper digits (i.e. step 235). The addition of steps 240 and 245, however, allow the website visitor time to prepare for the call, for instance by turning on or plugging in the corresponding device in the case of a wireless device such as a cell phone, by making sure that an adequate service signal is available for the device, by ensuring the device is not currently in use, or by positioning the corresponding device the interface 150.

In alternative embodiments, the web page displayed on website interface 150 illustrated in FIG. 7 provides an additional option for the website visitor to receive a call at a different number. Allowing this option prevents some potential problems and provides a convenience factor for the website visitor, but does so by trading off some level of security. For instance, it may be that the only phone number within the secure file housed on the database 140 is an old number previously used by the website visitor that is no longer in service. In such cases in these embodiments, as will be seen, the authentication process would not be possible but for an option to enter a new number. In other cases, it may be that the only number within the secure file corresponds to a phone that is not presently available to the website visitor for any number of reasons (e.g., it is a cell phone with a dead battery and no immediately available charging means, it is a land-line positioned remotely from the interface 150, etc.). By allowing the website visitor the option to enter a different number that corresponds to a presently available, working phone, the procedure may successfully continue.

As noted, however, this additional utility comes at a cost to security. By adding this step at this point of the procedure, the system has already verified that the website visitor has 1) correctly selected a number associated with that website visitor in the secure file, and 2) supplied the missing digits of that number. This tends to prove that the website visitor is at least familiar with a phone number of the individual associated with the secure file. However, by allowing the website visitor to provide a new phone number, the system no longer requires the website visitor to have access to the phone number in the file. Naturally someone with access to the phone number in the secure file is more likely to be the individual associated with the secure file, thus this additional safeguard is removed by the addition of the option to provide a new phone number.

Notwithstanding the option to provide an additional phone number, the procedure run by the web application of the server 110 continues by generating a random PIN and sending a request to the IVR system 120 to place a call as shown in step 250. While these are discreet processes, the web application of the server 110 preferably performs them simultaneously or with only a short time lag between the two. This is because, in a particular embodiment, selection of the "call me" prompt at step 245 (or submission of the proper missing phone digits in step 235 in embodiments where steps 240 and 245 are not present) initializes an internal countdown within the web application of the server 110. As will be seen, in this particular embodiment, the remainder of the authentication process must be completed before this countdown expires or the authentication process will fail. The time window available for the completion of the process can be configured by the system designer, but has been set at 15 minutes in the embodiment illustrated in FIG. 7. Though the time window could be enlarged, or even removed such that there is no temporal requirement for completion, such settings decrease security and clutter the server 110 with live, randomly generated PINs.

It should be noted that, up to the point at which the "call me" prompt is selected (or submission of the proper missing phone digits in step 235 in embodiments where steps 240 and 245 are not present), a website visitor can exit the process at any time and his or her progress through the authentication process will be saved by the web application on the server 110 for a specified length of time (e.g. 24 hours, etc.). Thus, should the website visitor later return to the website and request access to the same secure files within that length of time, the web application on the server 110 will re-initiate the authentication process where the visitor previously left off. This further eliminates concerns over having immediate access to the device associated with the selected phone number located within one or more of the databases 140. In such cases, the website visitor could simply log off the web application on the server 110, access the device corresponding to the phone number located within one or more of the databases 140, log back onto the web application on the server 110 and proceed with the authentication process. However, in some embodiments, once the random PIN is generated, the time window begins to expire so as to maintain the security of the PIN and prevent the application on the server 110 from maintaining too many live, randomly-generated PINs.

The web-application-generated PIN length and configuration varies across the different embodiments, but preferably comprises at least four non-repeating numeric digits. Once generated, it may be displayed on the interface 150 at step 270 in any variety of ways such as that shown in the illustrated embodiment of FIG. 8. At step 270, the web application on the server 110 preferably also provides a "call complete" prompt at the website interface 150 as will be discussed later. In some embodiments, the web application on the server 110 also provides a countdown timer on the website interface 150 showing the time remaining until the PIN expires.

The request from the web application on server 110 to place the call (made at step 250) is received by the IVR system 120. Either the web application on server 110 or the IVR system may track the amount of time the IVR system 120 has to initiate the call, which may correspond to the time window associated with the generated PIN. Again, it is noted that, in some embodiments, the IVR system 120 is operated by and integrated with the same computer that houses server 110, while in other embodiments it is operated by a separate computer in communication with the server 110. In response to the server request, the IVR system 120 places a call at step 255 to the phone number provided by the application running on server 110. If the IVR system 120 fails to connect with the phone 125 associated with that number after a predetermined period of time or number of rings, it will discontinue the call and wait a configurable amount of time (shown as four minutes in FIG. 2B) before trying the call again. The IVR system 120 is preferably equipped with the ability to detect a connection without a human response (e.g. an answering machine or voice mail). In such cases when a call is connected without a human response, the IVR system 120 preferably will disconnect the call and enter the waiting period before re-attempting the connection. The IVR system 120 preferably continues to attempt connection to the phone 125 in such a manner until either a proper connection is made or the time window associated with the PIN described above expires. If time expires prior to the proper connection being made, the IVR system 120 will record a "fail" response and will exit the cycle as shown in step 256.

Assuming the IVR system 120 makes a proper connection with the website visitor's phone 125, the IVR system 120 prompts the website visitor for the server-generated PIN at step 260. In some embodiments, the website visitor is prompted to enter the PIN using the keypad or other alphanumeric data entry method associated with his or her secondary device 125. In other embodiments, where the IVR system 120 utilizes its voice recognition or detection capability, the website visitor is given the option to speak the PIN into the phone 125. In some embodiments, such as that illustrated in the flowchart of FIG. 2B, the web application on the server 110 has also provided the IVR system 120 with the PIN which enables the IVR system 120 to determine the accuracy of the perceived response. Such embodiments are configurable to allow a website visitor multiple attempts to enter the proper PIN. In the embodiment illustrated in FIG. 2B, a website visitor is given only two chances. If the IVR system 120 determines that the initial response does not match the PIN, the process returns to step 260 and the website visitor is prompted to enter the PIN again. If, after the first chance, the website visitor again enters a response that does not match the PIN, the IVR system 120 plays a message noting that the authentication process failed at step 298 and records a "fail" response. If, either on the initial or the subsequent attempt, the website visitor provides a response that the IVR system 120 is able to match to the PIN, the IVR system 120 plays a message noting that the PIN was entered correctly at step 296 and records a "success" response. In embodiments where the IVR system 120 lacks the capability to make such a determination or is not provided with the PIN, it records the response and conveys it to the application on server 110 so that the application can make the comparison. In such embodiments, the remainder of the flowchart on FIG. 2B does not apply and the web application on server 110 displays a verification failure message at step 299 (if it determines the response does not match the PIN) or a verification success message at step 300 (if it determines the response does match the PIN) on the website interface 150.

Figure 8:
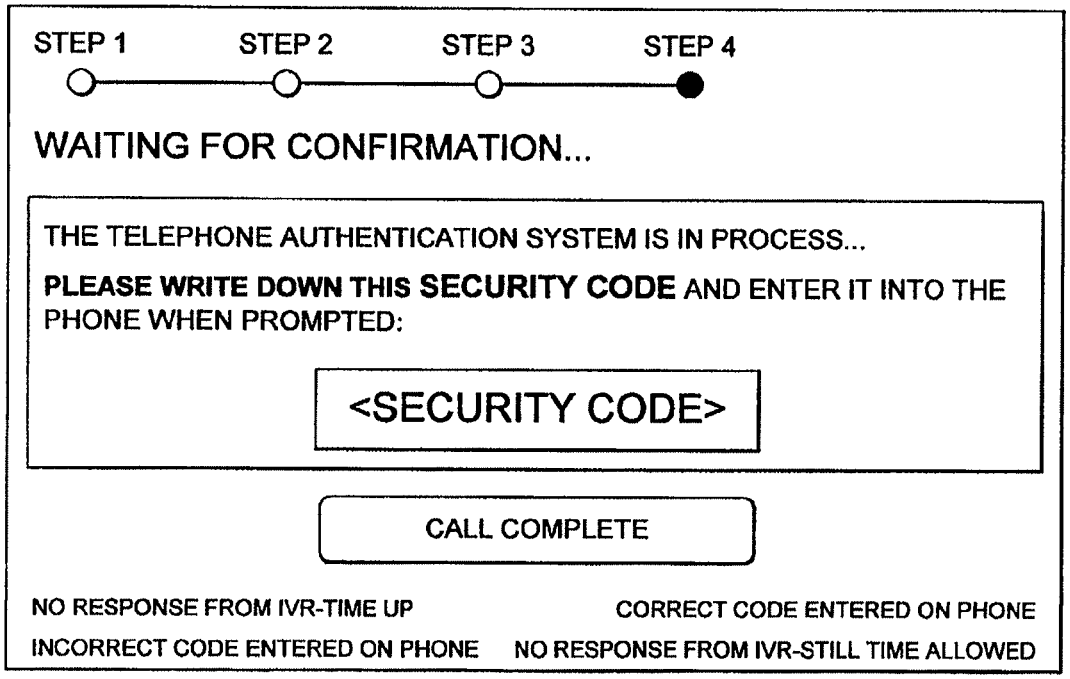
FIG. 8 is a website interface requesting a website visitor to complete an authentication process according to a particular embodiment.

As demonstrated by the illustrated embodiment of FIG. 8, once the PIN is generated by the web application on server 110, the application displays the PIN as well as a "call complete" prompt on the interface 150 at step 270. The "call complete" prompt takes on different forms across embodiments, but generally presents itself as a way for the website visitor to communicate to the web application on server 110 that he or she has successfully interfaced with the IVR system 120 (i.e. that the IVR system 120 has connected with his or her phone 125, requested the PIN, and the PIN has been submitted). In the embodiments that utilize the IVR system, from the server standpoint, the authentication process is on hold until the "call complete" button is selected by the website visitor at step 272. However, the web application on server 110 continues to countdown the time available for completion of the process. Once the "call complete" button has been selected, the web application on server 110 determines whether the time window for authentication has expired. If it has, the web application on server 110 displays a verification failure message on the website interface 150 at step 299. In some embodiments, the message is tailored in such cases to explain that time for call completion has expired. However, if time remains within the authentication time window when the "call complete" button is selected, the web application on server 110 checks the response recorded within the IVR system 120 at step 275.

In a particular embodiment, step 275 results in one of three possibilities. First, the web application on the server 110 may find that the IVR system 120 has yet to receive a response. Such would be the case where a website visitor inadvertently selected the "call complete" button at step 272 prior to actually completing the call. In other cases, there may have been some communication error between the website visitor's phone 125 and the IVR system 120, or in the recording process of the IVR system 120 itself. Either way, in cases where the web application on the server 110 finds no recorded response corresponding to the call to the website visitor's phone 125, the web application on the server 110 displays a message on the website interface 150 at step 280 conveying that the PIN was not received, and that another call must be requested. The process then returns to step 250 so that the website visitor may request a new call. In most embodiments, the system is designed so as not to generate a new PIN and start a new countdown when returned to step 250 in such a fashion. Instead, the initial time window will continue to expire and the old PIN will still apply and be presented on the website interface 150 when the website visitor once again reaches step 270. In alternative embodiments, the entire process reverts to step 250 such that selection of the "call me" button generates a new PIN and a fresh time window.

Other possibilities at step 275 include, but are not limited to, an IVR recorded response of "success" or "fail." In the latter case, the web application of the server 110 displays a verification failure message on the website interface 150 at step 299. However, if the IVR recorded response is "success," the web application of the server 110 displays a verification success message on the interface 150 at step 300 and proceeds to step 400 to display the desired secure file data requested by the website visitor.

Alternative embodiments of the verification system involve a transfer of some function from the server 110 to the IVR system 120 such that the PIN is generated by the computer processor associated with the IVR system. In such embodiments, the user request for a call at step 245 causes the server 110 to send a request to the IVR system 120 not only to place the call, but to generate and reply with a PIN. Having done so, the server 110 displays the PIN through the website interface 150. Still other embodiments reverse the flow of PIN communication with the website visitor. In such cases, the PIN, whether generated by the IVR system 120 or the server 110, is delivered audibly or via data communication, such as e-mail, SMS or text message, through the website visitor's secondary device 125 for entry into the interface 150. In such embodiments, the server 110 may cause the interface 150 to display a PIN entry field and awaits the website visitor's input once the call is initiated.

Figure 3:
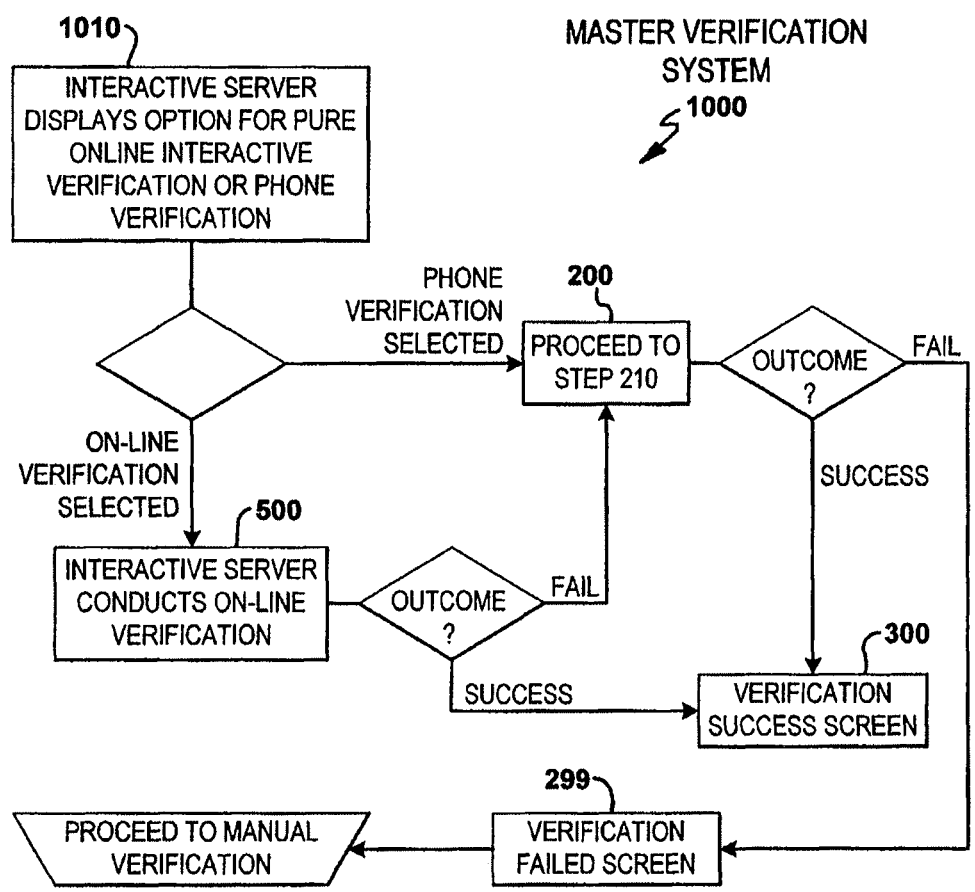
FIG. 3 is a flow chart depicting steps of a particular embodiment of a telephone identity verification process as part of an identity verification process.

One or more of the foregoing embodiments and other embodiments based on one or more principles of the invention may be implemented within an overall master verification system. A representative master verification system is shown in FIG. 3. Here, the process discussed in combination with FIGS. 2A and 2B may be implemented at step 200. While a website visitor will typically navigate his or her internet browser on the interface 150 to the web application on the server 110 and request access to certain data as set forth in steps 200 and 205 of FIG. 2A, the website visitor is presented with an option to proceed with authentication by answering a series of on-line questions or by receiving an automated phone call at step 1010. Depending on the website visitor's selection between these options, the master verification system will then proceed with the phone authentication system at step 200 as discussed above, or an on-line authentication system symbolized by step 500 wherein the website visitor is either prompted with a variety of questions about pre-supplied data within the secure file or existing data within the confidential data with which the website visitor may be familiar. Should the website visitor choose the pure on-line authentication system and it fail, the website visitor may automatically be requested to conduct the phone authentication system at step 200. If the phone verification system also fails for any reason such as those described above that result in arrival at step 299, the website visitor may be required to proceed to a manual authentication process with the entity that controls the database 140 housing the secure data files the website visitor wishes to access.

The master verification system is designed to be configurable such that a server operator may make either authentication process (pure on-line as in step 500 or phone as in step 200) the default. In such cases, a choice is not presented at step 1010, but rather a website visitor is directed according to the primary authentication process. In the event that the primary process fails, the secondary process could be used. In an alternative embodiment, both processes serve as back-ups to each other such that, in the case of selection and failure of the phone authentication process at step 1010 of FIG. 3, the website visitor is routed to the pure on-line authentication process at step 500 and vice versa. Thus, only in the event of failure of both authentication processes is the website visitor forced to conduct manual authentication, which typically requires correspondence through traditional mail or carrier systems.

While many of the foregoing embodiments have been described in the context of specific exemplary embodiments, such description is not intended to be limiting. For example, while many of the foregoing embodiments have been described in the context of the Internet, it is again noted that one or more principles of the invention may be incorporated in the context of any type of network environment wherein a user seeks access to secure or confidential data associated with the user. By further example, it is also again noted that an authentication system may not include an IVR system. In such a case, a system for accessing confidential data of a user via a network is contemplated whereby a user accesses an application/server process via a user device for providing access to the confidential data related to the user, which includes an authentication function that must be completed prior to user access to the confidential data. Initial data is requested from the user, which is used to locate one or more files associated with the confidential data. At least one incomplete portion of the confidential data relating to the user, and not including the initial data, is presented to the user via the user device along with at least one other portion of data having a substantially identical format to the incomplete portion of the confidential data. The user is requested to provide additional data to complete the incomplete portion of the confidential data. Upon successful completion of the data, the user is ultimately granted access to the confidential data. Any number of iterations of requests for data completion from the user may be implemented in the authentication function.

It should be understood that the invention is not be limited to any single embodiment and should only be construed in breadth and scope in accordance with recitation of the appended claims.

The invention claimed is:
1. A method for authenticating an identity of a user seeking access to data related to the user via a client device in communication with a server, the method comprising the steps of:
    requesting initial authentication data from the user, the initial authentication data comprising wallet information associated with the user;
    using the initial authentication data, searching for a data file associated with the user in a database associated with the server, the data file including confidential data associated with the user; and
    if the data file is found,
        sending to the client device a plurality of randomly ordered and selectable options, wherein one of the selectable options corresponds to a correct option comprising an incomplete portion of an item in the data file, and wherein the other selectable options correspond to false options provided in a format similar to the correct option;
        receiving a selection from the user of a selected one of the options, and
        if the selected one of the options is the correct option;
            requesting by the server and receiving from the client device additional data entered by the user in an attempt to complete the incomplete portion of the item;

determining by the server whether the additional data entered by the user correctly completes the incomplete portion of the item; and granting the user access to the data file if the server determines that the additional data entered by the user correctly completes the incomplete portion of the item.

2. The method of claim 1, wherein the incomplete portion of the item corresponds to the last four digits of a telephone number associated with the user.

3. The method of claim 1, wherein the incomplete portion of the item is based on non-wallet information.

4. The method of claim 1, comprising the step of:

prior to granting the user access to the data file, placing a call to a telephone number in the data file if the server determines that the additional data entered by the user correctly completes the incomplete portion of the item.

5. The method of claim 4, comprising the step of:

prior to granting the user access to the data, communicating a PIN to be entered by the user into one of either the client device or a device associated with the telephone number.

6. A non-transitory computer-readable medium having computer-executable instructions for performing steps of a server process for authenticating an identity of a user seeking access to confidential data related to the user over a network via a client interface, the steps comprising:

requesting initial authentication data from the user, the initial authentication data comprising wallet information associated with the user;

using the initial authentication data, searching for a data file associated with the user in a database associated with the server, the data file comprising confidential data associated with the user; and if the data file is found, sending to the client device a plurality of randomly ordered and selectable options, wherein one of the selectable options corresponds to a correct option comprising an incomplete portion of an item in the data file, and wherein the other selectable options correspond to false options provided in a format similar to the correct option;

receiving a selection from the user of a selected one of the options, and if the selected one of the options is the correct option;

requesting by the server and receiving from the client interface additional data entered by the user in an attempt to complete the incomplete portion of the item;

determining whether the additional data entered by the user correctly completes the incomplete portion of the item; and granting the user access to the data file including the confidential data associated with the user if the additional data entered by the user correctly completes the incomplete portion of the item.

7. The non-transitory computer-readable medium of claim 6, further comprising the step of:

prior to granting the user access to the data file including the confidential data, placing a call to a telephone number in the data file if the additional data entered by the user correctly completes the incomplete portion of the item.

8. The non-transitory computer-readable medium of claim 7, further comprising the step of:

prior to granting the user access to the data file including the confidential data, communicating a PIN to be entered by the user into one of either the client interface or a device associated with the telephone number.

9. A non-transitory computer readable medium having software code for execution on a computer processor, for authenticating an identity of a user seeking access to confidential data related to the user over a network via a client device, comprising:

a first code segment configured to receive initial authentication data from the user, the initial authentication data comprising wallet information associated with the user;

a second code segment configured to search, using the initial authentication data, for a data file associated with the user in at least one database, the data file comprising confidential data of the user;

a third code segment configured to transmit to the client device a plurality of randomly ordered and selectable options, wherein one of the selectable options corresponds to a correct option comprising an incomplete portion of an item in the data file, and wherein the other selectable options correspond to false options provided in a format similar to the correct option;

a fourth code segment configured to request and receive from the client device a selection from the user of a selected one of the options;

a fifth code segment configured to determine whether the selected one of the options is the correct option;

a sixth code segment configured to receive from the client device additional data entered by the user to complete the incomplete portion of the item;

a seventh code segment configured to determine whether the additional data entered by the user correctly completes the incomplete portion of the item; and an eighth code segment configured to grant the user access to the data file including the confidential data related to the user if the additional data entered by the user correctly completes the incomplete portion of the item.

10. The method of claim 1, wherein the server is associated with a credit bureau, a bank, an insurance company, or a hospital.

11. The method of claim 1, wherein the initial authentication data comprises an account number associated with the user.

12. The method of claim 1, wherein the wallet information comprises a name of the user.

13. The method of claim 1, wherein the wallet information comprises an address associated with the user.

14. The method of claim 1, wherein the wallet information comprises a date of birth associated with the user.

15. The method of claim 1, wherein the wallet information comprises at least a portion of a social security number associated with the user.

16. The method of claim 1, wherein the item comprises non-wallet information.

17. The method of claim 1, wherein the data file comprises a credit file of the user.

18. The method of claim 1, wherein the confidential data comprises a credit record, a tax record, a medical record, a financial record, or an insurance record.

19. The method of claim 1, wherein the incomplete portion of the item comprises an incomplete portion of a telephone number associated with the user.

20. The method of claim 19, comprising the step of:

placing a telephone call to the telephone number associated with the user when the server receives data indicative of the user completing the incomplete portion of the telephone number via entry into the client interface.

21. The method of claim 20, comprising the step of:
communicating instructions to the user via the telephone call to complete authentication.

22. The method of claim 1, comprising the step of:
placing a telephone call to a telephone number obtained from the data file.

23. The method of claim 22, comprising the step of:
communicating a PIN via the telephone call to enable the user to complete authentication.

24. The method of claim 23, wherein the PIN is randomly generated.

25. The method of claim 23, wherein the PIN expires after a predetermined time period.

\* \* \* \* \*